(12) United States Patent
Chang et al.

(10) Patent No.: US 8,237,790 B2
(45) Date of Patent: Aug. 7, 2012

(54) SYSTEM AND METHOD FOR POSITIONING A PORTION OF AN OBJECT TO BE MEASURED

(75) Inventors: Chih-Kuang Chang, Taipei Hsien (TW); Li Jiang, Shenzhen (CN); Yong-Hong Ding, Shenzhen (CN); Xiao-Guang Xue, Shenzhen (CN); Yan-Li Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 424 days.

(21) Appl. No.: 12/477,911

(22) Filed: Jun. 4, 2009

(65) Prior Publication Data
US 2010/0053403 A1    Mar. 4, 2010

(30) Foreign Application Priority Data
Aug. 29, 2008   (CN) .......................... 2008 1 0304297

(51) Int. Cl.
*H04N 9/47* (2006.01)
*H04N 7/18* (2006.01)
*H04N 17/00* (2006.01)
*H04N 17/02* (2006.01)
*H04N 5/225* (2006.01)
*H04N 5/232* (2006.01)

(52) U.S. Cl. ....... 348/95; 348/87; 348/190; 348/207.11; 348/211.9

(58) Field of Classification Search .............. 348/86–87, 348/94–95, 180, 189–190, 207.1, 207.11, 348/211.4–211.6, 211.8–211.9
See application file for complete search history.

(56) References Cited

U.S. PATENT DOCUMENTS

| 6,205,636 | B1 * | 3/2001 | Abe et al. ..................... 29/407.1 |
| 7,679,643 | B2 * | 3/2010 | Shingu ..................... 348/207.11 |
| 2003/0193560 | A1 * | 10/2003 | Oh et al. ......................... 348/87 |

* cited by examiner

*Primary Examiner* — Daniel M Pasiewicz
(74) *Attorney, Agent, or Firm* — Altis Law Group, Inc.

(57) ABSTRACT

A system and method for positioning a portion of an object to be measured includes installing a digital camera adjacent to a charge coupled device (CCD) lens of an image measuring machine, setting positioning parameters corresponding to different positions of the digital camera on a Z-axis of a world coordinate system, receiving an image of the object captured by the digital camera, and selecting corresponding positioning parameters according to a position of the digital camera. The method further includes selecting a point of the portion of the object in the image, calculating coordinates of the selected point in a plane of the CCD lens, and controlling the CCD lens to move to the calculated coordinates so as to position the CCD lens on the portion of the object.

10 Claims, 5 Drawing Sheets

SYSTEM AND METHOD FOR POSITIONING A PORTION OF AN OBJECT TO BE MEASURED

BACKGROUND

1. Technical Field

Embodiments of the present disclosure relate to systems and methods for measuring objects, and particularly to a system and method for positioning a portion of an object to be measured.

2. Description of Related Art

Measurement is an important phase in the manufacturing process and is closely interrelated to product quality. Generally, an engineer will use an image measuring machine to obtain an electronic image of an object. The image is stored in a computer and may be shown on a display device, where a program is used to determine precision of the object according to pixel data in the image.

A charge coupled device (CCD) lens of the image measuring machine is connected to an image adapter card of the computer. The CCD lens, which has a focusing function within a fixed capture area, is used to capture images of the object. At present, if a portion of the object needs to be measured, the CCD lens of the image measuring machine is moved to focus onto the measured portion manually, so as to capture the image of the measured portion of the object. However, if an object has two similar portions to be measured, and the two similar portions are adjacent to each other, it is difficult to focus onto one of the two similar portions accurately by manually moving the CCD lens.

DETAILED DESCRIPTION

All of the processes described below may be embodied in, and fully automated via, functional code modules executed by one or more general purpose computers or processors. The code modules may be stored in any type of readable medium or other storage device. Some or all of the methods may alternatively be embodied in specialized hardware. Depending on the embodiment, the readable medium may be a hard disk drive, a compact disc, a digital video disc, or a tape drive.

Figure 1:
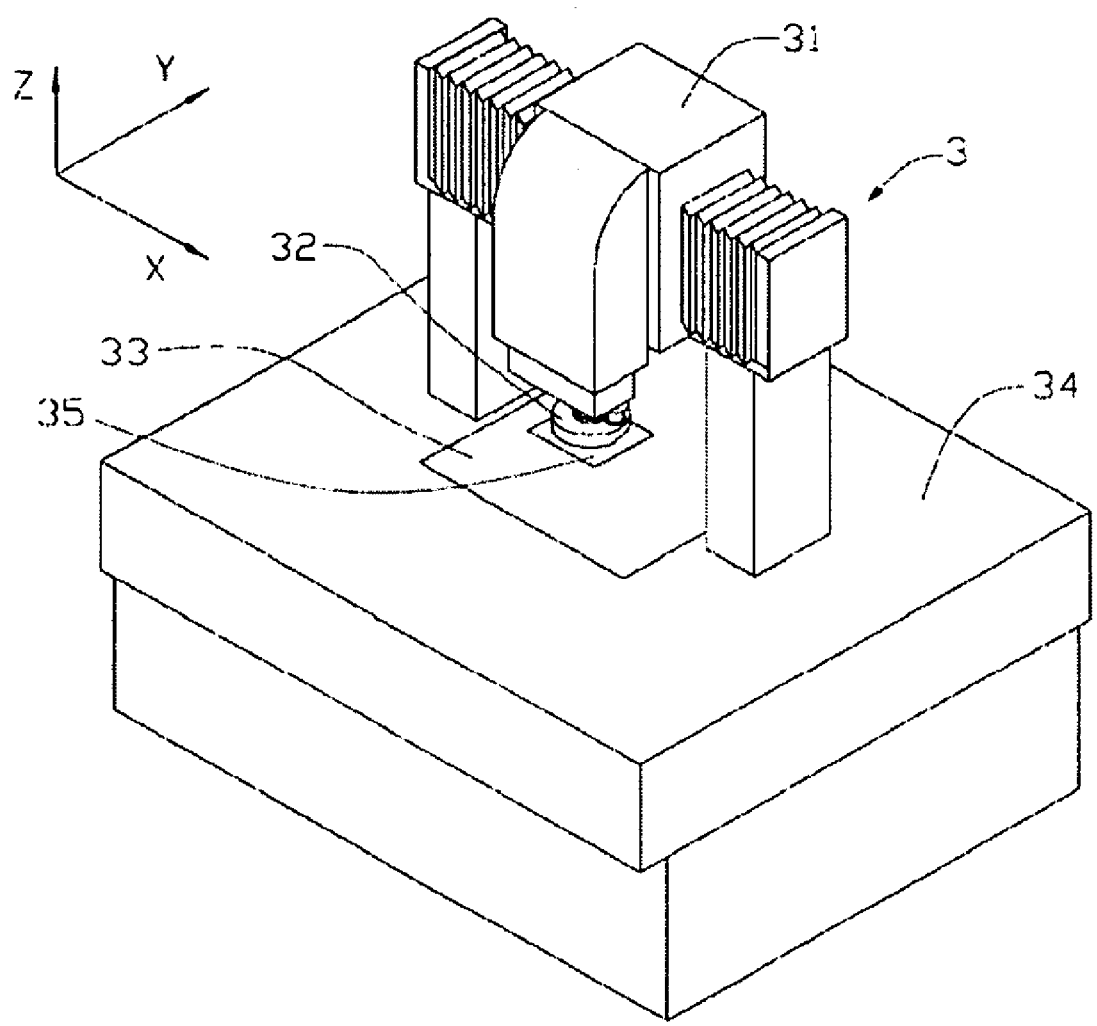
FIG. 1 is a schematic diagram of one embodiment of an image measuring machine.

A schematic diagram of one embodiment of an image measuring machine 3 is shown in FIG. 1. The image measuring machine 3 includes parts of a top cover 31, a machine lens 32, a platform 33, and a holder 34. An object 35 (e.g., a chipset on a motherboard) to be measured is positioned on the platform 33. It may be understood that the embodiment of the image measuring machine 3 as illustrated in FIG. 1 is exemplary and may include other components that will be explained further herein, such as an X-axis motor along the X-axis, a Y-axis motor along the Y-axis, and an Z-axis motor along the Z-axis.

Figure 2:
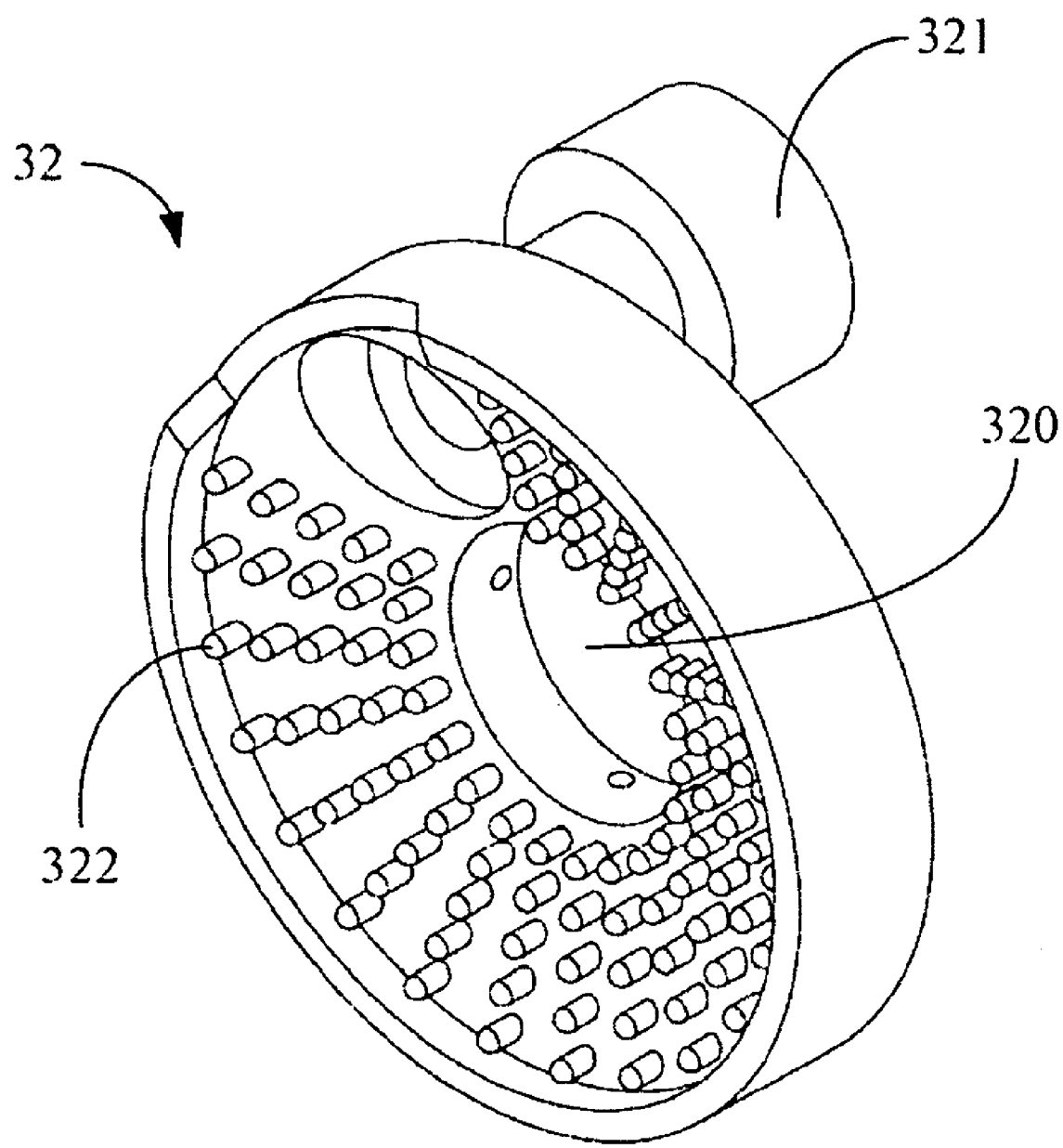
FIG. 2 is a schematic view of one embodiment of a machine lens.
Figure 3:
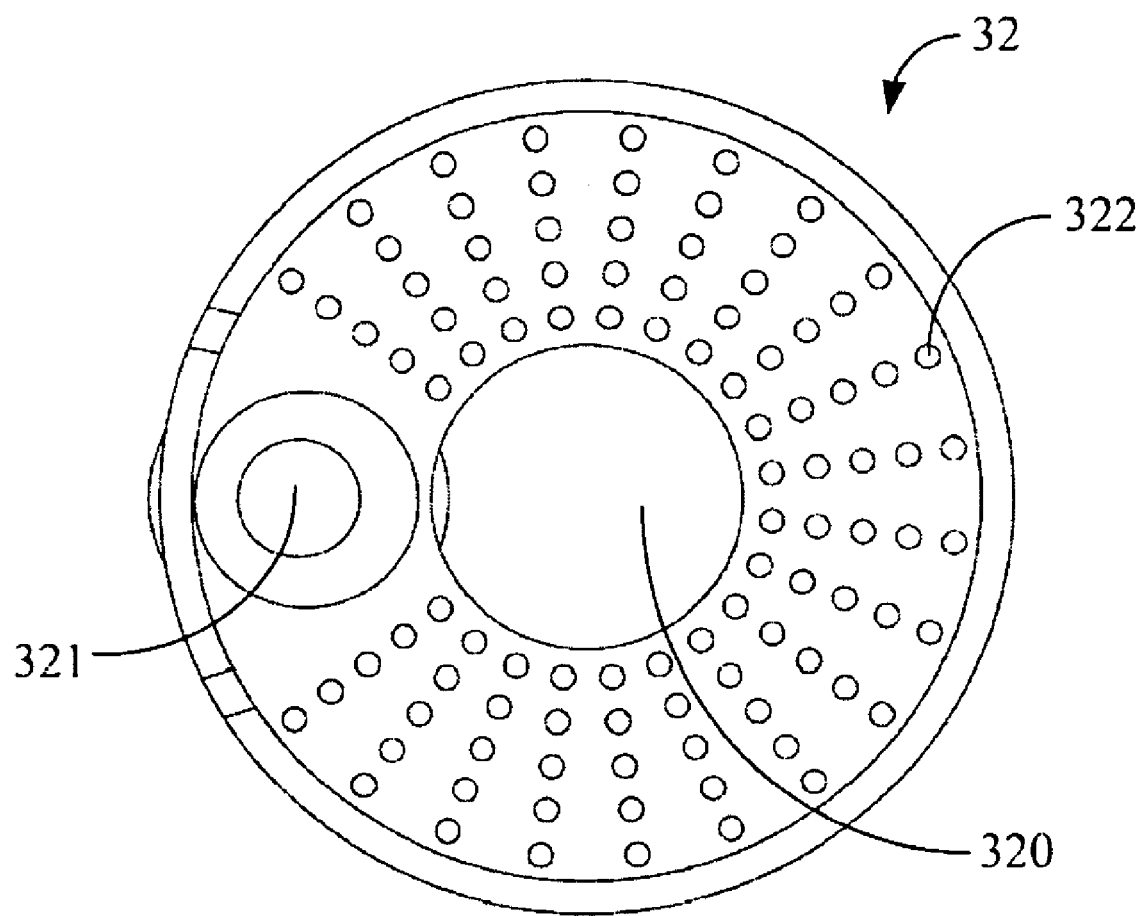
FIG. 3 is a plane view of one embodiment of the machine lens.

A schematic view of one embodiment of the machine lens 32 is shown in FIG. 2, and a plane view of one embodiment of the machine lens 32 is shown in FIG. 3. In one embodiment, the machine lens 32 includes parts of a charge coupled device (CCD) lens 320, a digital camera 321 adjacent to the CCD lens 320, and light emitting diodes (LEDs) 322 arranged in a circular manner around the CCD lens 320. The digital camera 321 captures images of the object 35 using the light source provided by the LEDs 322, and transfer the captured images to a computer 2.

Figure 4:
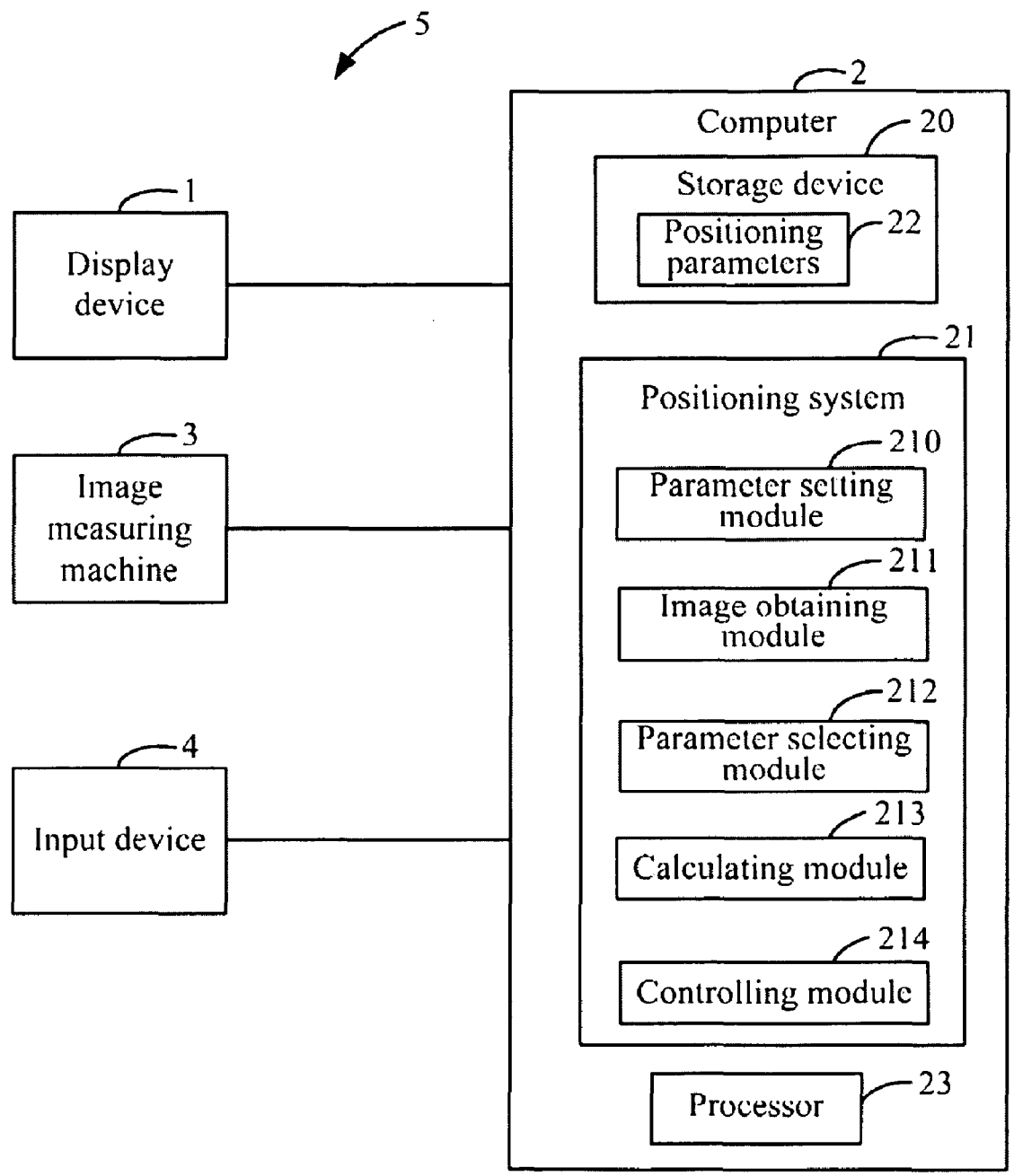
FIG. 4 is a block diagram of one embodiment of a computer comprising a system for positioning a portion of an object to be measured.

FIG. 4 is a block diagram of one embodiment of the computer 2 comprising a positioning system 21 for positioning a portion of the object 35 to be measured. In one embodiment, the computer 2 is electronically connected to a display device 1, the image measuring machine 3, and an input device 4. Depending on the embodiment, the display device 1 may be a liquid crystal display (LCD) or a cathode ray tube (CRT) display, for example.

The computer 2 includes a storage device 20 for storing many kinds of information, such as positioning parameters 22. In one embodiment, the positioning parameters 22 include coefficients of conversion formulas between a plane of the CCD lens 320 and a plane of the digital camera 321. A detailed description will be shown in followed paragraphs.

The input device 4 is provided for manually moving one or more parts of the image measuring machine 3, e.g., along the X-axis, the Y-axis, and/or the Z-axis (refer to X-Y-Z coordinates shown in FIG. 3). The input device 4 may be a lever for adjusting positions of image measuring machine 3 manually.

In one embodiment, the positioning system 21 includes a parameter setting module 210, an image obtaining module 211, a parameter selecting module 212, a calculating module 213, and a controlling module 214. In one embodiment, the modules 210-214 comprise computerized instructions that are stored in the storage device 20. A processor 23 of the computer 2 executes the computerized instructions to implement one or more operations of the computer 2.

The parameter setting module 210 sets the positioning parameters 22 corresponding to different positions of the digital camera 321 on the Z-axis of a world coordinate system (WCS), and stores the positioning parameters 22 in the storage device 20. As mentioned above, the positioning parameters 22 include the coefficients of the conversion formulas between the plane of the CCD lens 320 and the plane of the digital camera 321. The world coordinate system (i.e., the X-Y-Z coordinate system) refers to FIG. 1, and an origin of the world coordinate system may be one vertex of the object 35. A detailed description of setting the positioning parameters 22 are as follows.

At first, the machine lens 32 is fixed at a position of the Z-axis of the world coordinate system, and the object 35 is positioned on the platform 33. Then, the digital camera 321 captures an image of the object 35, transfers the image to the computer 2, and displays the image on the display device 1. For example, supposing "w" represents a width of the object 35, "h" represents a height of the object 35. Thus, the coordinates of the four vertexes of the object 35 in the world coordinate system are expressed as follows: (0, 0, Z), (w, 0, Z), (w, h, Z), and (0, h, Z), where "Z" represents a Z-axis coordinate of the digital camera 321, the coordinates of (0, 0), (w, 0), (w, h), and (0, h) are subpoints of the four vertexes of the object 35 on a X-Y plane of the world coordinate system. The coordinates of the four vertexes of the object 35 in the image can be calculated if a boundary of the object 35 in the image is selected manually, such as: (u0, v0), (u1, v1), (u2, u2), and (u3, v3). The positioning parameters 22 corresponding to the current position of the digital camera 321 on the Z-axis can be calculated by the conversion formulas between the plane of the CCD lens 320 and the plane of the digital camera 321. The conversion formulas between the plane of the CCD lens 320 and the plane of the digital camera 321 are as follows.

$$x1 = a0 + a1*x + a2*y + a3*x*y \quad (1)$$

$$y1 = b0 + b1*x + b2*y + b3*x*y \quad (2)$$

In the formulas (1) and (2), "(x1, y1)" represents coordinates of points in the plane of the CCD lens 320, "(x, y)" represents coordinates of points in the plane of the digital camera 321. The positioning parameters 22 are coefficients of the formulas (1) and (2), such as "a0, a1, a2, a3, b0, b1, b2, b3". In one embodiment, the values of "a0, a1, a2, a3, b0, b1, b2, b3" can be calculated using the coordinates of (0, 0), (w, 0), (w, h), (0, h), (u0, v0), (u1, v1), (u2, u2), and (u3, v3).

The image obtaining module 211 receives the image of the object 35 captured by the digital camera 321.

The parameter selecting module 212 selects corresponding positioning parameters 22 according to a position of the digital camera 321 on the Z-axis, and further obtains a selected point of a portion of the object 35 in the image.

The calculating module 213 calculates coordinates of the selected point in the plane of the CCD lens 320 according to the selected positioning parameters 22 and the conversion formulas between the plane of the CCD lens 320 and the plane of the digital camera 321.

The controlling module 214 controls the CCD lens 320 of the image measuring machine 3 to move to a position corresponding to the calculated coordinates so as to position the CCD lens 320 on the portion of the object 35. In one embodiment, the controlling module 213 controls the CCD lens 320 of the image measuring machine 3 to move to the position corresponding to the calculated coordinates includes: aligning an X-axis coordinate of a center of the CCD lens 320 as an X-axis coordinate of the calculated coordinates, and aligning a Y-axis coordinate of a center of the CCD lens 320 as a Y-axis coordinate of the calculated coordinates.

Figure 5:
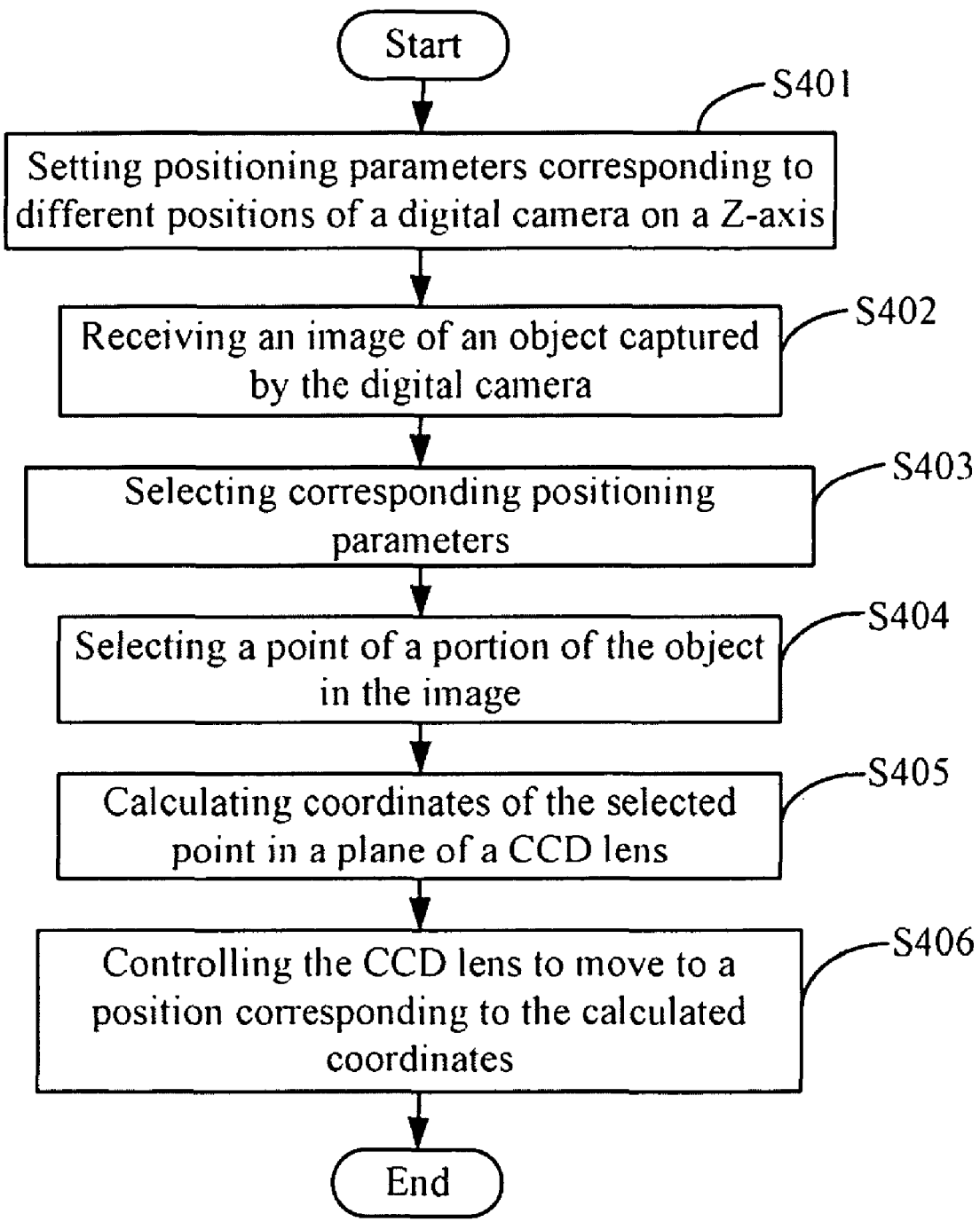
FIG. 5 is a flowchart of one embodiment of a method for positioning a portion of an object to be measured.

FIG. 5 is a flowchart of one embodiment of a method for positioning a portion of the object 35 to be measured.

In block S401, the parameter setting module 210 sets positioning parameters 22 corresponding to different positions of the digital camera 321 on the Z-axis of the world coordinate system (WCS), and stores the positioning parameters 22 in the storage device 20. In one embodiment, the positioning parameters 22 include the coefficients of the conversion formulas between the plane of the CCD lens 320 and the plane of the digital camera 321. The world coordinate system (i.e., the X-Y-Z coordinate system) refers to FIG. 1, and an origin of the world coordinate system may be one vertex of the object 35. A detailed description of setting the positioning parameters 22 refers to paragraph is explained above.

In block S402, the image obtaining module 211 receives the image of the object 35 captured by the digital camera 321.

In block S403, the parameter selecting module 212 selects corresponding positioning parameters 22 according to a position of the digital camera 321 on the Z-axis.

In block S404, a point of a portion of the object 35 in the image is selected.

In block S405, the calculating module 213 calculates coordinates of the user-selected point in the plane of the CCD lens 320 according to the selected positioning parameters 22 and the conversion formulas between the plane of the CCD lens 320 and the plane of the digital camera 321.

In block S406, the controlling module 214 controls the CCD lens 320 of the image measuring machine 3 to move to a position corresponding to the calculated coordinates so as to position the CCD lens 320 on the portion of the object 35. In one embodiment, the controlling module 213 controls the CCD lens 320 of the image measuring machine 3 to move to the position corresponding to the calculated coordinates includes: aligning an X-axis coordinate of a center of the CCD lens 320 as an X-axis coordinate of the calculated coordinates, and aligning a Y-axis coordinate of a center of the CCD lens 320 as a Y-axis coordinate of the calculated coordinates.

The present embodiment automatically positions the CCD lens 320 of the image measuring machine 3 on a portion of the object 35 in response to a user selects a point of the portion of the object 35 in an image of the object 35 captured by the digital camera 321.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for positioning a portion of an object to be measured by an image measuring machine comprising a digital camera positioned adjacent to a charge coupled device (CCD) lens of the image measuring machine, the method comprising:

setting positioning parameters corresponding to different positions of the digital camera on a Z-axis of a world coordinate system, wherein the positioning parameters are coefficients of conversion formulas between a plane of the CCD lens and a plane of the digital camera;

receiving an image of the object captured by the digital camera;

selecting corresponding positioning parameters according to a position of the digital camera on the Z-axis;

selecting a point of the portion of the object in the image;

calculating coordinates of the selected point in the plane of the CCD lens according to the selected positioning parameters and the conversion formulas between the plane of the CCD lens and the plane of the digital camera; and controlling the CCD lens of the image measuring machine to move to a position corresponding to the calculated coordinates so as to position the CCD lens on the portion of the object.

2. The method according to claim 1, wherein controlling the CCD lens of the image measuring machine to move to a position corresponding to the calculated coordinates comprises:

aligning an X-axis coordinate of a center of the CCD lens as an X-axis coordinate of the calculated coordinates; and aligning a Y-axis coordinate of a center of the CCD lens as a Y-axis coordinate of the calculated coordinates.

3. The method according to claim 1, wherein the conversion formulas between the plane of the CCD lens and the plane of the digital camera comprise:

$$x1 = a0 + a1*x + a2*y + a3*x*y; \quad (1)$$

$$y1 = b0 + b1*x + b2*y + b3*x*y; \quad (2)$$

wherein "(x1, y1)" represent coordinates of points in the plane of the CCD lens, "(x, y)" represent coordinates of points in the plane of the digital camera, and "a0, a1, a2, a3, b0, b1, b2, b3" represent the coefficients of the conversion formulas (1) and (2).

4. A non-transitory storage medium having stored thereon instructions that, when executed by a processor of a computer, causes the processor to perform a method for positioning a portion of an object to be measured by an image measuring machine comprising a digital camera positioned adjacent to a charge coupled device (CCD) lens of the image measuring machine, the method comprising:

setting positioning parameters corresponding to different positions of the digital camera on a Z-axis of a world coordinate system, wherein the positioning parameters are coefficients of conversion formulas between a plane of the CCD lens and a plane of the digital camera;

receiving an image of the object captured by the digital camera;

selecting corresponding positioning parameters according to a position of the digital camera on the Z-axis;

selecting a point of the portion of the object in the image;

calculating coordinates of the selected point in the plane of the CCD lens according to the selected positioning parameters and the conversion formulas between the plane of the CCD lens and the plane of the digital camera; and controlling the CCD lens of the image measuring machine to move to a position corresponding to the calculated coordinates so as to position the CCD lens on the portion of the object.

5. The non-transitory storage medium according to claim 4, wherein controlling the CCD lens of the image measuring machine to a position corresponding to move to the calculated coordinates comprises:

aligning an X-axis coordinate of a center of the CCD lens as an X-axis coordinate of the calculated coordinates; and aligning a Y-axis coordinate of a center of the CCD lens as a Y-axis coordinate of the calculated coordinates.

6. The non-transitory storage medium according to claim 4, wherein the medium is selected from the group consisting of a hard disk drive, a compact disc, a digital video disc, and a tape drive.

7. The non-transitory storage medium according to claim 4, wherein the conversion formulas between the plane of the CCD lens and the plane of the digital camera comprise:

$$x1 = a0 + a1*x + a2*y + a3*x*y; \quad (1)$$

$$y1 = b0 + b1*x + b2*y + b3*x*y; \quad (2)$$

wherein "(x1, y1)" represent coordinates of points in the plane of the CCD lens, "(x, y)" represent coordinates of points in the plane of the digital camera, and "a0, a1, a2, a3, b0, b1, b2, b3" represent the coefficients of the conversion formulas (1) and (2).

8. A computing system for positioning a portion of an object to be measured by an image measuring machine comprising a digital camera positioned adjacent to a charge coupled device (CCD) lens of the image measuring machine, comprising:

a parameter setting module operable to set positioning parameters corresponding to different positions of the digital camera on a Z-axis of a world coordinate system, wherein the positioning parameters are coefficients of conversion formulas between a plane of the CCD lens and a plane of the digital camera;

an image obtaining module operable to receive an image of the object captured by the digital camera;

a parameter selecting module operable to select corresponding positioning parameters according to a position of the digital camera on the Z-axis;

the parameter selecting module further operable to obtain a select point of the portion of the object in the image;

a calculating module operable to calculate coordinates of the selected point in the plane of the CCD lens according to the selected positioning parameters and the conversion formulas between the plane of the CCD lens and the plane of the digital camera; and a controlling module operable to control the CCD lens of the image measuring machine to move to a position corresponding to the calculated coordinates so as to position the CCD lens on the portion of the object.

9. The system according to claim 8, wherein the controlling module controls the CCD lens of the image measuring machine to move to a position corresponding to the calculated coordinates comprises:

aligning an X-axis coordinate of a center of the CCD lens as an X-axis coordinate of the calculated coordinates; and aligning a Y-axis coordinate of a center of the CCD lens as a Y-axis coordinate of the calculated coordinates.

10. The system according to claim 8, wherein the conversion formulas between the plane of the CCD lens and the plane of the digital camera comprise:

$$x1 = a0 + a1*x + a2*y + a3*x*y; \quad (1)$$

$$y1 = b0 + b1*x + b2*y + b3*x*y; \quad (2)$$

wherein "(x1, y1)" represent coordinates of points in the plane of the CCD lens, "(x, y)" represent coordinates of points in the plane of the digital camera, and "a0, a1, a2, a3, b0, b1, b2, b3" represent the coefficients of the conversion formulas (1) and (2).

* * * * *